(12) United States Patent
Matlik (10) Patent No.: US 12,194,545 B2
(45) Date of Patent: Jan. 14, 2025

(54) CLAMPING DEVICE FOR TOOL HOLDER

(71) Applicant: AB SANDVIK COROMANT, Sandviken (SE)

(72) Inventor: Gunnar Matlik, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 411 days.

(21) Appl. No.: 17/786,215

(22) PCT Filed: Dec. 9, 2020

(86) PCT No.: PCT/EP2020/085272
§ 371 (c)(1),
(2) Date: Jun. 16, 2022

(87) PCT Pub. No.: WO2021/122220
PCT Pub. Date: Jun. 24, 2021

(65) Prior Publication Data
US 2022/0388075 A1    Dec. 8, 2022

(30) Foreign Application Priority Data

Dec. 20, 2019 (EP) .................................... 19218651

(51) Int. Cl.
*B23B 31/26* (2006.01)
(52) U.S. Cl.
CPC ........ *B23B 31/265* (2013.01); *B23B 2231/12* (2013.01); *B23B 2260/146* (2013.01)

(58) Field of Classification Search
CPC ............ B23B 31/261; B23B 2260/034; B23B 31/265; B23B 2231/12; B23B 2260/146; Y10T 409/309464
See application file for complete search history.

(56) References Cited

U.S. PATENT DOCUMENTS

| 4,290,720 A | * | 9/1981 | Ferreira | ................ B23B 31/263 279/75 |
| 4,632,613 A | * | 12/1986 | Wollermann | ......... B23B 31/261 279/155 |
| 5,018,916 A | | 5/1991 | Bauch et al. | |

FOREIGN PATENT DOCUMENTS

EP    1468767 B1    12/2016

* cited by examiner

*Primary Examiner* — Eric A. Gates
*Assistant Examiner* — Reinaldo A Del Vargas Rio
(74) *Attorney, Agent, or Firm* — Corinne R. Gorski (57) ABSTRACT

A clamping device for releasably holding a tool holder shank includes a housing, a drawbar axially moveable in a bore in the housing between an advanced releasing position and a retracted locking position, engagement members moveable under the effect of the drawbar into locking engagement with the tool holder shank, and a sleeve arranged around a wall of the housing and axially moveable in relation to it. A first wedge is received in a first aperture in the wall and configured to move the drawbar rearwards in the bore when pressed radially inwards in the aperture by movement of the sleeve in a first axial direction. A second wedge is received in a second aperture in the wall and configured to move the drawbar forwards in the bore when pressed radially inwards in the aperture by movement of said sleeve in an opposite axial direction.

15 Claims, 6 Drawing Sheets

CLAMPING DEVICE FOR TOOL HOLDER

RELATED APPLICATION DATA

This application is a § 371 National Stage Application of PCT International Application No. PCT/EP2020/085272 filed Dec. 9, 2020 claiming priority to EP 19218651.8 filed Dec. 20, 2019.

FIELD OF THE INVENTION AND PRIOR ART

The present invention relates to a clamping device according to the preamble of claim 1, which is intended to be used for connecting a tool holder to a machine tool.

Within the field of machine tools for metal cutting, the cutting tools, for instance in the form of drills, milling tools or lathe tools, used for machining work pieces of metallic material are often fixed to a tool holder, which in its turn may be detachably fixed to a clamping device that is mounted to a machine tool. It is previously know to clamp a shank of such a tool holder to the housing of a clamping device by means of a clamping mechanism arranged in the housing. Tool holders for cutting tools in the form of drills and milling tools are normally clamped to a rotatable housing in the form of a spindle, whereas tool holders for lathe tools may be clamped to a non-rotatably arranged housing. When the cutting tool needs to be exchanged, the tool holder is released from the housing of the clamping device and a new tool holder with another cutting tool is clamped to the housing. A clamping device of this type may for instance be detachably fixed at the periphery of a tool turret included in a machine tool.

A clamping device comprising a spindle with a clamping mechanism adapted for an automatic tool changing operation is previously known from EP 1 468 767 B1. In the clamping device according to EP 1 468 767 B1, an actuating member in the form of a first drawbar is slidably mounted inside the spindle and configured to effect an axial displacement of a second drawbar via a force amplifying mechanism comprising a number of co-operating wedges arranged between the drawbars. A gas spring inside the spindle is configured to urge the two drawbars into a retracted locking position, in which a tool holder is clamped to the spindle, and a hydraulic piston may be configured to act on a piston at the rear end of the gas spring in order to achieve a displacement of the two drawbars into an advanced releasing position, in which the tool holder may be released from the spindle. However, this previously known clamping device has a relatively long axial extent and it is therefore not suitable to use this type of clamping device when tool holders are to be detachably fixed at the periphery of a tool turret where the available axial space for the clamping device is limited.

OBJECT OF THE INVENTION

The object of the present invention is to provide a clamping device of the above-mentioned type that has a new and favourable design and that is suitable for use with a tool turret of a machine tool.

SUMMARY OF THE INVENTION

According to the invention, said object is achieved by means of a clamping device having the features defined in claim 1.

The clamping device according to the invention comprises:
a housing having a front end, a rear end and a bore which intersects the front end and extends rearwardly therefrom, wherein a mounting portion for receiving the tool holder shank is provided at a front end of the bore;
a drawbar slidably mounted inside the bore so as to be reciprocally moveable in the bore along a longitudinal axis thereof between an advanced releasing position and a retracted locking position;
engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the housing;
a first wedge slidably received in a first aperture that extends radially through a peripheral wall of the housing, wherein the first wedge comprises a first wedge surface, which faces towards the rear end of the housing and is in contact with a first slide surface on the drawbar facing towards the front end of the housing, and a first pressure receiving surface, which faces outwards from the housing, the first wedge being configured to press the drawbar towards the retracted locking position when it is pressed radially inwards in the first aperture;
a second wedge slidably received in a second aperture that extends radially through the peripheral wall, wherein the second wedge comprises a second wedge surface, which faces towards the front end of the housing and is in contact with a second slide surface on the drawbar facing towards the rear end of the housing, and a second pressure receiving surface, which faces outwards from the housing, the second wedge being configured to press the drawbar towards the advanced releasing position when it is pressed radially inwards in the second aperture; and
an actuating sleeve arranged around the peripheral wall and slidably mounted to it so as to be axially moveable in relation to the housing in a first axial direction in order to effect a movement of the drawbar from the advanced releasing position to the retracted locking position and in an opposite second axial direction in order to effect a movement of the drawbar from the retracted locking position to the advanced releasing position, wherein the actuating sleeve on its inner side is provided with a first pressure applying surface, which faces inwards for contacting the first pressure receiving surface and has a radial distance to the longitudinal axis that increases as seen in said first axial direction, and a second pressure applying surface, which faces inwards for contacting the second pressure receiving surface and has a radial distance to the longitudinal axis that increases as seen in said second axial direction.

The first pressure applying surface of the actuating sleeve is configured to press the first wedge radially inwards in the first aperture by pressing against the first pressure receiving surface when the actuating sleeve is moved in said first axial direction. The second pressure applying surface of the actuating sleeve is configured to press the second wedge radially inwards in the second aperture by pressing against the second pressure receiving surface when the actuating sleeve is moved in said second axial direction. Thus, the drawbar is moveable from the advanced releasing position to the retracted locking position under the effect of the actuating sleeve and the first wedge by movement of the actuating sleeve in said first axial direction, and the drawbar is moveable from the retracted locking position to the advanced releasing position under the effect of the actuating sleeve and the second wedge by movement of the actuating sleeve in said second axial direction.

Since the first pressure applying surface of the actuating sleeve has a radial distance to the longitudinal axis that increases in the first axial direction, a movement of the actuating sleeve in the first axial direction will cause a pressure to be applied by the first pressure applying surface on the first pressure receiving surface on the first wedge. This pressure will have a component in the radial direction such that the first wedge is pressed radially inwards towards the longitudinal axis.

Since the second pressure applying surface of the actuating sleeve has a radial distance to the longitudinal axis that increases in the second axial direction, a movement of the actuating sleeve in the second axial direction will cause a pressure to be applied by the second pressure applying surface on the second pressure receiving surface on the second wedge.

This pressure will have a component in the radial direction such that the second wedge is pressed radially inwards towards the longitudinal axis.

By using the above-mentioned actuating sleeve for controlling the axial movement of the drawbar, no gas spring or the similar that takes up a lot of space in the axial direction is required for controlling the axial movement of the drawbar, which implies that the clamping device can be made compact in axial direction. The clamping device is therefore suitable for use in tool turrets. Furthermore, the use of separate wedges for controlling the axial movement of the drawbar in the two different directions implies that the design of the first wedge can be optimized to suit the specific requirements associated with the movement of the drawbar from the advanced releasing position to the retracted locking position and that the design of the second wedge can be optimized to suit the specific requirements associated with the opposite movement of the drawbar from the retracted locking position to the advanced releasing position.

The above-mentioned housing of the clamping device may have the form of a rotatable spindle, which may be connected or connectable to a drive mechanism in a tool turret of a machine tool. However, the clamping device of the present invention is not limited to use in a tool turret, and such a housing in the form of a rotatable spindle could as an alternative constitute the main spindle of a machine tool or be connected to such a main spindle without any intermediate tool turret. When the housing has the form of a rotatable spindle, the clamping device may be used for clamping tool holders provided with drilling or milling tools or other types of rotating tools. The housing included in the clamping device of the present invention may as a further alternative be a non-rotatable housing. In the latter case, the clamping device may be used for clamping tool holders provided with lathe tools or other types of non-rotating tools.

According to an embodiment of the invention, the actuating sleeve is configured to assume a self-locking axial position on the peripheral wall of the housing when the drawbar has been forced into the retracted locking position under the effect of the actuating sleeve and the first wedge, so as to thereby keep the drawbar in the retracted locking position. Hereby, the actuating sleeve is capable of keeping the drawbar in the retracted locking position without requiring any external force from an actuator, which implies that the actuating sleeve only needs to be subjected to external force from an actuator, for instance in the form of a hydraulic or pneumatic actuator, in connection with a tool changing operation.

According to another embodiment of the invention, the first pressure applying surface and the first pressure receiving surface are inclined in relation to the longitudinal axis by such an angle $\alpha$ that the first wedge will keep the actuating sleeve in a self-locking axial position on the peripheral wall when the drawbar has been forced into the retracted locking position under the effect of the actuating sleeve and the first wedge. In this case, the first pressure applying surface and the first pressure receiving surface both extend in the same direction when viewed in a longitudinal section through the housing. The angle $\alpha$ is chosen so as to be below a self-lock threshold angle, such that the actuating sleeve attains a self-locking axial position in relation to the first wedge when the drawbar has been displaced inside the bore into the retracted locking position. To obtain a self-locking axial position, the angle $\alpha$ should be sufficiently small, i.e. below the self-lock threshold angle. A self-locking axial position refers to an axial position in which the static frictional force between the first pressure receiving surface on the first wedge and the first pressure applying surface on the actuating sleeve is greater than the opposing force in the plane of friction that is caused by a force applied to the first wedge in a radial direction perpendicular to the longitudinal axis. Hence, a self-locking axial position is obtained within an angular range that depends on the coefficient of friction between the first pressure receiving surface on the first wedge and the first pressure applying surface on the actuating sleeve. This coefficient of friction depends on various parameters, such as the materials used, coatings on the surfaces, use of lubricants, etc. Hence, the self-lock threshold angle is dependent on such parameters. A person skilled in the art will be able to identify the self-lock threshold angle that apply in each specific case by using common general knowledge and/or routine experiments, or at least predict or assess whether a certain angle is below such a self-lock threshold angle. In general, it is preferred to choose an angle $\alpha$ that is well below the self-lock threshold angle, to thereby ensure a self-locking configuration. A further benefit of using a small angle $\alpha$ is that a force-amplifying effect is achieved, owing to the fact that a small angle $\alpha$ implies that a relatively long axial displacement of the actuating sleeve will result in a relatively short axial displacement of the drawbar. However, a too small angle $\alpha$ may be inefficient and not practically well-functioning. For example, a very small angle $\alpha$ may render it difficult to release the actuating sleeve from the self-locking axial position. The angle $\alpha$ is with advantage between 2° and 10°. With an angle $\alpha$ within this range, a self-locking effect as well as an appropriate force-amplifying effect may be achieved.

Another embodiment of the invention is characterized in:
that the first wedge comprises a third pressure receiving surface which faces outwards from the housing;
that the actuating sleeve on its inner side is provided with a third pressure applying surface which faces inwards for contacting the third pressure receiving surface, the third pressure applying surface having a radial distance to the longitudinal axis that increases as seen in said first axial direction;

that the third pressure applying surface and the third pressure receiving surface are inclined in relation to the longitudinal axis by an angle β which is larger than the angle α; and that the first and third pressure applying surfaces and the first and third pressure receiving surfaces are arranged consecutively on the actuating sleeve and on the first wedge, respectively, such that, upon a movement of the actuating sleeve in the first axial direction, the third pressure applying surface is configured to slide and press against the third pressure receiving surface on the first wedge during a first phase of the movement and the first pressure applying surface is configured to slide and press against the first pressure receiving surface on the first wedge during a subsequent second phase of the movement.

Hereby, the drawbar may be quickly moved in axial direction during the initial phase of the clamping under the effect of the larger angle β. This initial clamping phase does not require much force. However, during the final phase of the clamping, a great force is required for displacing the drawbar a short distance.

When the actual clamping occurs, i.e. when the engagement members assume the above-mentioned first position, the drawbar is moved in axial direction under the effect of the smaller angle α such that the axial movement of the drawbar will be small as compared to the axial movement of the actuating sleeve, which results in a force-amplifying effect, also referred to as "power boost". The angle β is suitably between 10° and 75°, preferably between 35° and 65°, which provides an efficient initial axial movement of the drawbar. By using a steep angle β for the initial axial movement of the drawbar and a small angle α for the actual clamping, the actuating sleeve (and thus the entire clamping device) can be made relatively short in the axial direction while still providing a self-locking clamping mechanism with a significant force-amplifying effect.

According to another embodiment of the invention, the first and third pressure applying surfaces and the first and third pressure receiving surfaces are curved as seen in a cross-sectional plane perpendicular to the longitudinal axis, which will facilitate the manufacturing of the actuating sleeve.

According to another embodiment of the invention, the first pressure applying surface and the second pressure applying surface partly overlap each other in the axial direction of the actuating sleeve and are spaced apart from each other in the circumferential direction of the actuating sleeve. The length of the actuating sleeve may hereby be reduced. Furthermore, the second pressure applying surface is with advantage provided in a recess formed in a rotationally symmetric inner wall surface of the actuating sleeve.

According to another embodiment of the invention, the clamping device comprises two or more such first wedges spaced apart in the circumferential direction of the peripheral wall, wherein each first wedge is received in a respective first aperture that extends radially through the peripheral wall. The clamping device may also comprise two or more such second wedges spaced apart in the circumferential direction of the peripheral wall, wherein each second wedge is received in a respective second aperture that extends radially through the peripheral wall. The first apertures and the associated first wedges, as well as the second apertures and the associated second wedges, are preferably evenly distributed in the circumferential direction of the peripheral wall. Hereby, a well-balanced clamping device with good force distribution is obtained. A very high number of wedges and associated apertures may however be unfavourable, owing to the fact that each aperture will reduce the strength of the housing. Three first wedges and three second wedges with associated apertures will give a well-balanced clamping device with a suitable level of force distribution, while still maintaining a sufficient strength of the housing. The first wedges and the second wedges are with advantage alternately arranged as seen in the circumferential direction of the peripheral wall, wherein each one of the first wedges is followed by one of the second wedges as seen in the circumferential direction of the peripheral wall and each one of the second wedges is followed by one of the first wedges as seen in the circumferential direction of the peripheral wall.

Further advantageous features of the clamping device according to the present invention will appear from the description following below and the dependent claims.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

A clamping device 1 according to an embodiment of the present invention is illustrated in FIGS. 1-10. The clamping device 1 is configured to releasably clamp a tool holder 60 (very schematically illustrated in the drawings) to a housing 2 of the clamping device and enable the machining of a work piece by means of a cutting tool (not shown) fixed to the tool holder 60.

The housing 2 has a front end 2a, a rear end 2b and a bore 3 which intersects the front end 2a and extends rearwardly therefrom. Thus, the bore 3 has an entrance opening 3a (see FIG. 3) at the front end 2a of the housing. The housing 2 is connectable to a tool turret of a machine tool via a connection member 4, which extends from the housing 2 at the rear end thereof.

In the illustrated embodiment, the housing 2 has the form of a machine spindle, and this spindle-shaped housing 2 may be rotatably mounted in a surrounding casing by means of rolling bearings. In this case, the housing 2 may be connectable to a drive mechanism of a machine tool, for instance a drive mechanism in a tool turret of a machine tool, via the connection member 4 in order to allow the housing 2 to be driven in rotation by the drive mechanism. However, the housing 2 may as an alternative be designed as a non-rotatable housing.

Figure 1:
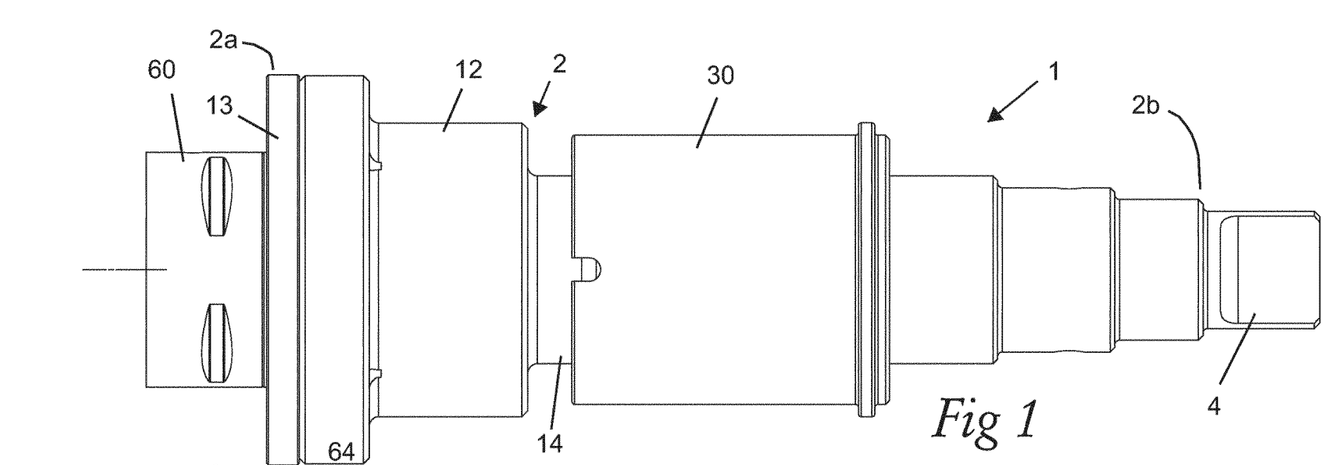
FIG. 1 is a lateral view of a clamping device according to an embodiment of the present invention, with a tool holder clamped to the housing of the clamping device.
Figure 2:
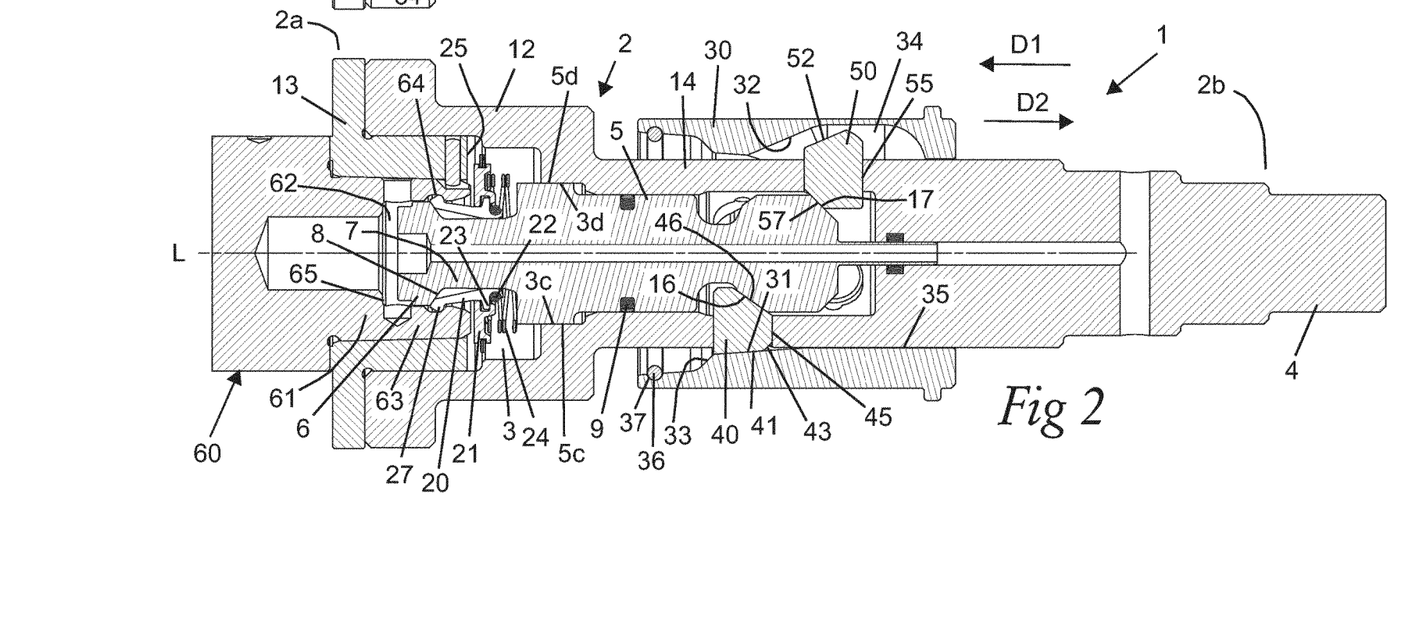
FIG. 2 is a longitudinal section through the clamping device and tool holder shown in FIG. 1, with the drawbar of the clamping device in a retracted locking position and with the tool holder clamped to the housing.
Figure 3:
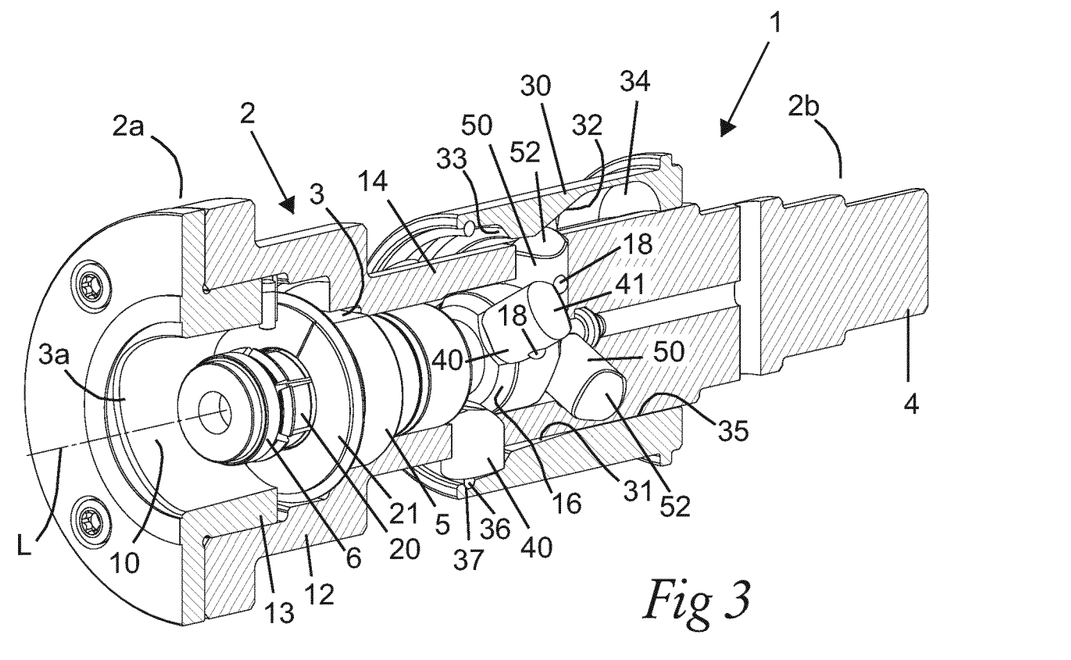
FIG. 3 is a partly cut perspective view of the clamping device of FIG. 1.
Figure 4:
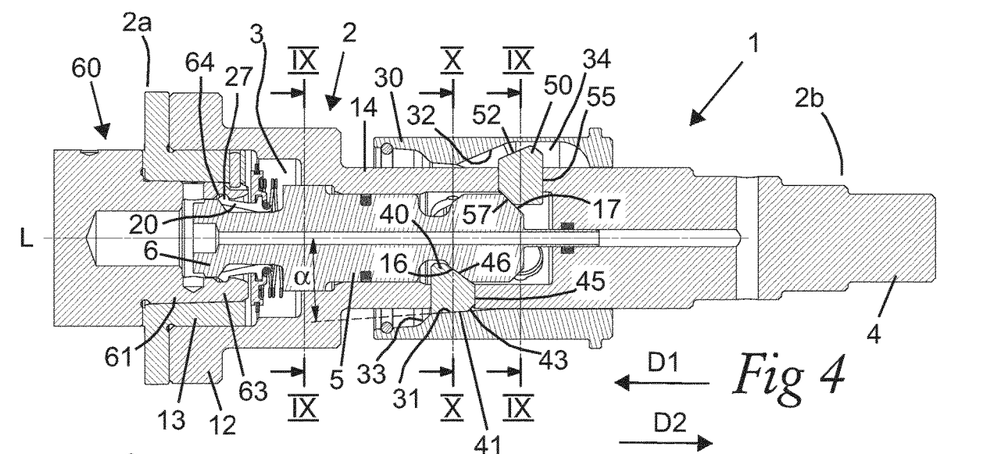
FIG. 4 is a longitudinal section corresponding to FIG. 2.

A drawbar 5 is slidably mounted inside the bore 3 of the housing 2 so as to be reciprocally moveable in the bore 3 along a longitudinal axis L thereof between an advanced releasing position (see FIG. 5) and a retracted locking position (see FIGS. 2 and 4). The drawbar 5 has a front end facing the entrance opening 3a of the bore 3 and an opposite rear end. A head portion 6 and a neck portion 7 are provided at the front end of the drawbar 5. The head portion 6 is located in front of the neck portion 7 as seen in the longitudinal direction of the drawbar, wherein the head portion 6 is connected to the neck portion 7 via a rearwardly facing bevelled surface 8 on the head portion 6. A sealing ring 9 is arranged between the drawbar 5 and an inner surface of the bore 3. In the illustrated example, this sealing ring 9 is received in a groove on the outer side of the drawbar 5.

The drawbar 5 is prevented from rotating in relation to the housing 2. In the illustrated embodiment, two planar wall sections 5c, 5d (see FIGS. 2 and 9) are provided on opposite sides of the drawbar 5 at a portion of the drawbar located behind the neck portion 7, wherein these planar wall sections 5c, 5d are in sliding contact with a respective planar surface 3c, 3d in the bore 3 in order to prevent mutual rotation between the drawbar 5 and the housing 2. However, mutual rotation between the drawbar 5 and the housing 2 could be prevented in any other suitable manner.

A mounting portion 10 for receiving a mounting shank 61 on the tool holder 60 is provided at a front end of the bore 3. This mounting shank 61 is here referred to as tool holder shank.

In the illustrated embodiment, the housing 2 comprises a base part 12 and an end piece 13 mounted to the base part 12 at the front end 2a of the housing. The end piece 13 has the form of a sleeve with an axial through hole that forms part of the above-mentioned bore 3. In this case, the above-mentioned mounting portion 10 is located in the through hole of the end piece 13. As an alternative, the part of the housing 2 accommodating the bore 3 could be formed in one piece without any end piece of the above-mentioned type.

The tool holder shank 61 is insertable into the mounting portion 10 of the bore 3 via the entrance opening 3a at the front end 2a of the housing 2. The head portion 6 of the drawbar is received in an engagement bore 62 in the tool holder shank 61 and a tubular wall 63 of the tool holder shank is received in a space between the head portion 6 and an inner surface of the end piece 13. In the illustrated embodiments, the mounting portion 10 is conically shaped and has a somewhat "triangular" or polygonal, non-circular cross-sectional shape adapted to receive a similarly shaped tool holder shank 61. The conical shape ensures a connection free from play in the radial as well as the axial direction between the tool holder shank 61 and the housing 2, whereas the non-circular cross-section ensures a non-rotatable fixation of the tool holder shank 61 to the housing 2. However, the mounting portion 10 could also have any other suitable shape for receiving other types of tool holder shanks.

Engagement members 20 in the form of segments are arranged around the drawbar 5 at a front end thereof. Under the effect of a movement of the drawbar 5 from the advanced releasing position to the retracted locking position, the engagement members 20 are moveable from a first position (see FIG. 5), in which the engagement members 20 allow the tool holder shank 61 to move into and out of the mounting portion 10 of the bore 3, to a second position (see FIGS. 2 and 4), in which the engagement members 20 are in locking engagement with an engagement groove 64 in the engagement bore 62 in the tool holder shank 61 and thereby keep the tool holder shank 61 secured to the housing 2.

In the illustrated embodiment, the engagement members 20 are arranged around the neck portion 7 of the drawbar 5 and held in place around the neck portion by means of a retainer ring 21 and an elastic O-ring 22, which are arranged in the bore 3 and surround the neck portion 7. Each engagement member 20 has an outwardly facing flange portion 23 engaged in an inner groove in the retainer ring 21. The O-ring 22 is received in an outwardly facing groove at the rear end of each engagement member 20. A compression spring 24 is also arranged in the bore 3 and configured to surround the drawbar 5. The compression spring 24 is mounted between a shoulder on the drawbar 5 and the retainer ring 21 and it is configured to urge the retainer ring 21 and the engagement members 20 forwards. The forward movement of the retainer ring 21 towards the entrance opening of the bore 3 is limited by a shoulder 25 provided in the bore 3. In the illustrated example, this shoulder 25 is formed by a rearwardly facing end surface of the end piece 13.

Figure 5:
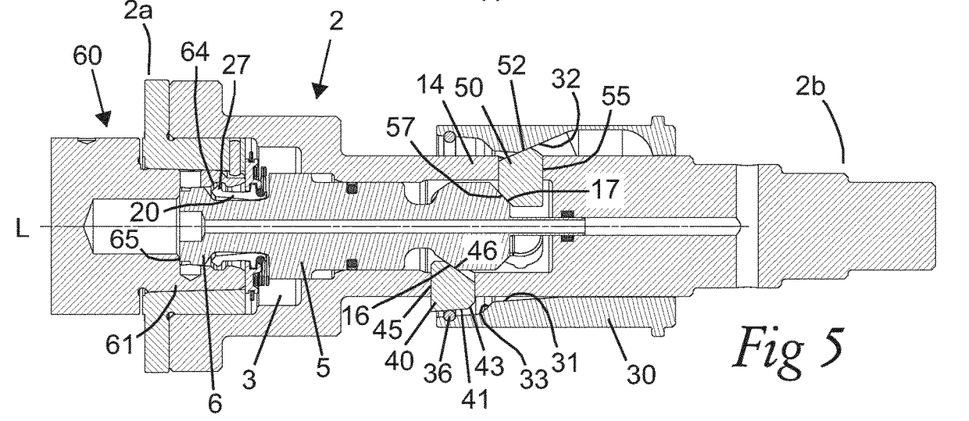
FIG. 5 is a longitudinal section through the clamping device and tool holder shown in FIG. 1, with the drawbar in an advanced releasing position.
Figure 6:
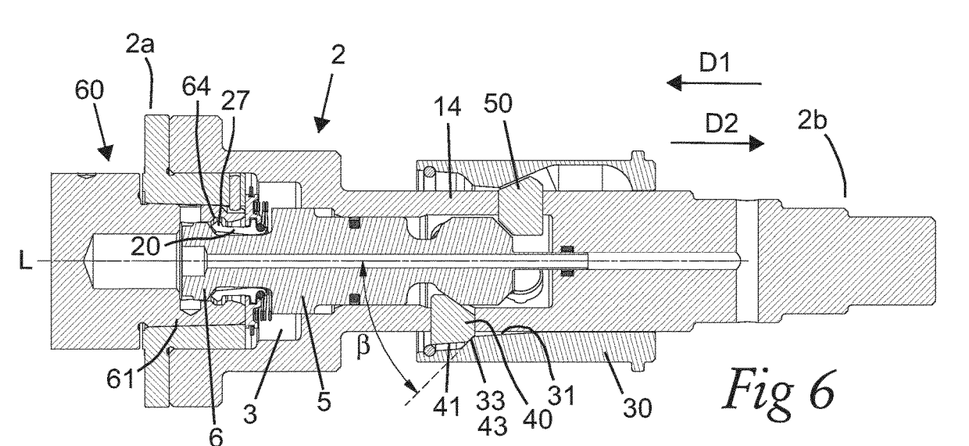
FIG. 6 is a longitudinal section through the clamping device and tool holder shown in FIG. 1, with the drawbar in an intermediate position between the advanced releasing position and the retracted locking position.
Figure 7:
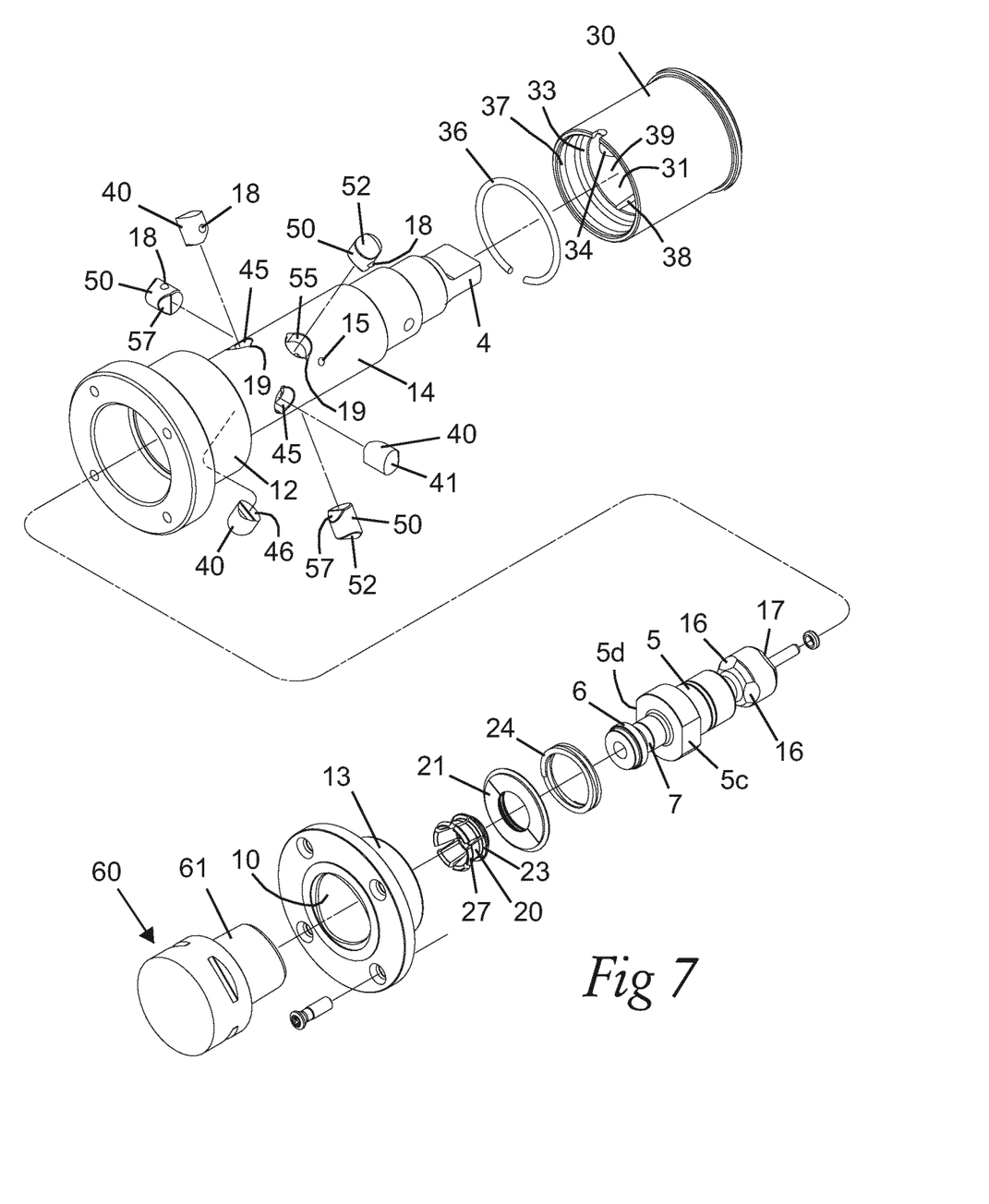
FIG. 7 is an exploded view of the clamping device and tool holder of FIG. 1.
Figure 8:
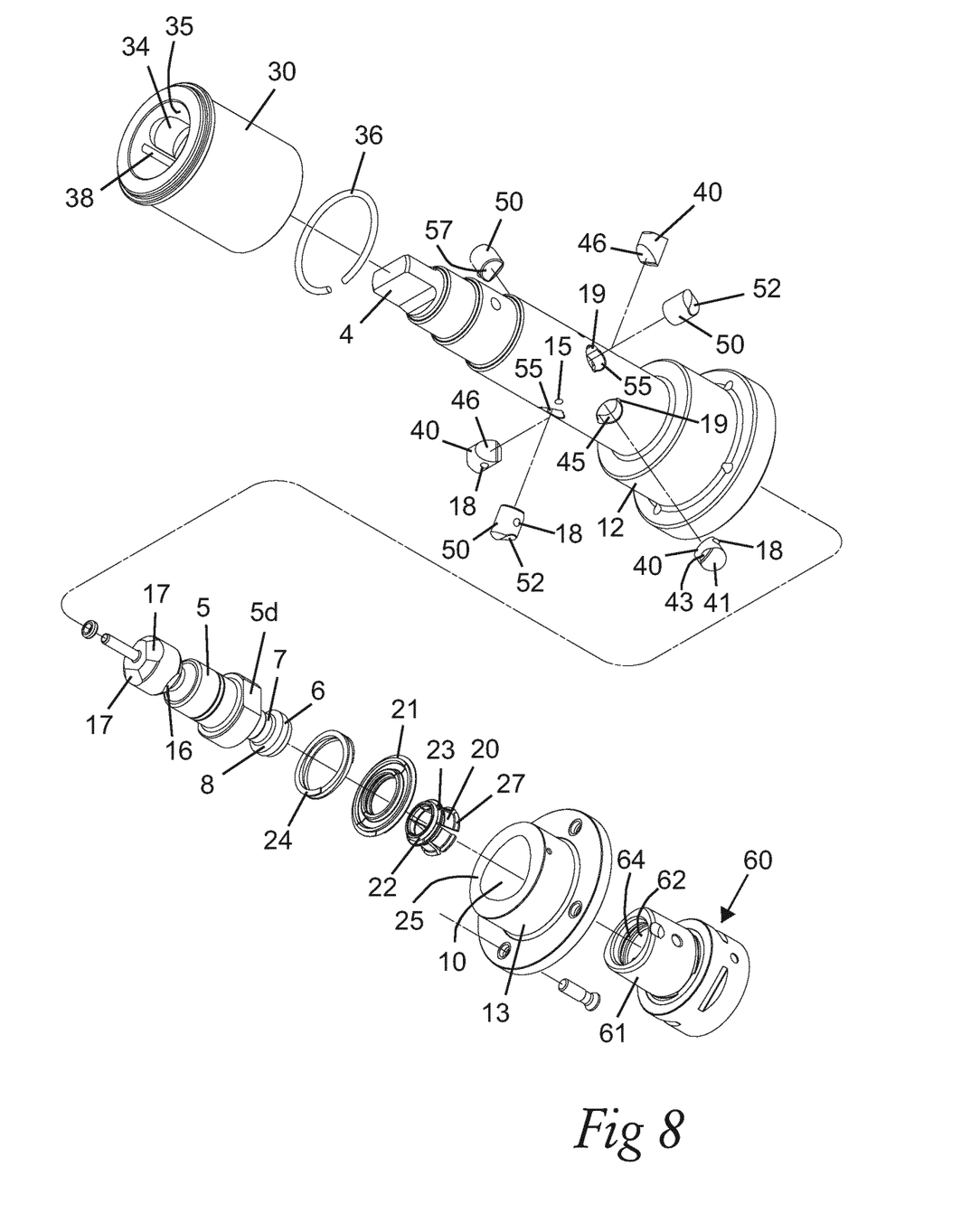
FIG. 8 is an exploded view from another direction of the clamping device and tool holder of FIG. 1.
Figure 9:
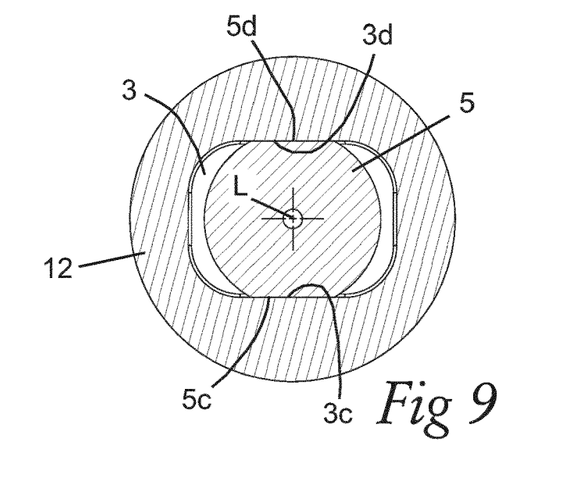
FIG. 9 is a cross-section according to the line IX-IX in FIG. 4.

At its front end, each engagement member 20 is provided with an outwardly directed engagement flange 27, which is configured to be in engagement with the engagement groove 64 in the tool holder shank 61 when the engagement member 20 is in the above-mentioned second position. When the drawbar 5 is in the advanced releasing position, the front ends of the engagement members 20 are located behind the head portion 6 of the drawbar 5 and the engagement flanges 27 are out of engagement with the engagement groove 64 in the tool holder shank 61, as illustrated in FIG. 5. When the drawbar 5 is moved axially rearwards in the bore 3 along the longitudinal axis L thereof, the bevelled surface 8 on the head portion 6 of the drawbar will come into contact with the front ends of the engagement members 20, wherein the front ends of the engagement members 20 will slide on this bevelled surface 8 and be pressed outwards so that the engagement flanges 27 on the engagement members come into engagement with the engagement groove 64 in the tool holder shank 61, whereupon the tool holder shank 61 will be pulled by the drawbar 5 into firm contact with inner surfaces of the end piece 13 at the above-mentioned mounting portion 10.

The clamping device 1 further comprises an actuating sleeve 30, which is arranged around a peripheral wall 14 of the housing 2 and slidably mounted to this peripheral wall 14 so as to be axially moveable in relation to the housing 2 along the longitudinal axis L. The actuating sleeve 30 is non-rotatably mounted to the housing 2, i.e. prevented from rotating in relation to the peripheral wall 14. In the illustrated example, balls 15 (see FIGS. 7 and 8) are arranged between the actuating sleeve 30 and the housing 2. The balls 15 are distributed in the circumferential direction of the peripheral wall 14 and each ball 15 is accommodated partly in a recess in the peripheral wall 14 and partly in a longitudinal groove 38 in the actuating sleeve 30. The balls 15 are fixed in axial position in relation to the peripheral wall 14 by being received in the recesses on the outer side of the peripheral wall. The balls 15 are slidably received in the longitudinal grooves 38 on the inner side of the actuating sleeve 30, and the actuating sleeve 30 is thereby allowed to move axially in relation to the balls 15 when the actuating sleeve is axially moved in relation to the peripheral wall 14. The balls 15 prevent mutual rotation between the actuating sleeve 30 and the peripheral wall 14.

One or more first wedges 40 are mounted to the housing 2 and configured to transfer an axial movement of the actuating sleeve 30 in a first axial direction D1 in relation to the housing 2 into a movement of the drawbar 5 from the advanced releasing position to the retracted locking position. Furthermore, one or more second wedges 50 are mounted to the housing 2 and configured to transfer an axial movement of the actuating sleeve 30 in an opposite second axial direction D2 in relation to the housing 2 into a movement of the drawbar 5 from the retracted locking position to the advanced releasing position. In the illustrated embodiment, the first axial direction D1 is a direction towards the front end 2a of the housing 2 and the second axial direction D2 a direction towards the rear end 2b of the housing 2. Thus, in this case a movement of the drawbar 5 from the advanced releasing position to the retracted locking position is effected by an axial movement of the actuating sleeve 30 forwards along the peripheral wall 14, whereas a movement of the drawbar 5 from the retracted locking position to the advanced releasing position is effected by an axial movement of the actuating sleeve 30 rearwards along the peripheral wall 14. However, as an alternative, the actuating sleeve 30 and the first and second wedges 40, 50 could be arranged to co-operate in such a manner that a movement of the drawbar 5 from the advanced releasing position to the retracted locking position is effected by an axial movement of the actuating sleeve 30 rearwards along the peripheral wall 14, and in such a manner that a movement of the drawbar 5 from the retracted locking position to the advanced releasing position is effected by an axial movement of the actuating sleeve 30 forwards along the peripheral wall 14. Thus, in the latter case, the first axial direction D1 is a direction towards the rear end 2b of the housing 2 and the second axial direction D2 a direction towards the front end 2a of the housing 2.

In the illustrated embodiment, the clamping device 1 comprises three first wedges 40, which are spaced apart in the circumferential direction of the peripheral wall 14. Each first wedge 40 is slidably received in a respective first aperture 45 that extends radially through the peripheral wall 14. The first wedges 40 are configured to jointly press the drawbar 5 towards the retracted locking position when they are pressed radially inwards in the associated first apertures 45.

The clamping device 1 may comprise any suitable number of first wedges 40 arranged to extend through a corresponding number of first apertures 45 in the peripheral wall 14 of the housing 2. The first wedges 40 and the associated first apertures 45 are preferably evenly distributed in the circumferential direction of the peripheral wall 14.

Each first wedge 40 comprises a first pressure receiving surface which faces outwards from the peripheral wall 14 of the housing 2, and the actuating sleeve 30 is on its inner side provided with first pressure applying surfaces 31 which face inwards for contacting the first pressure receiving surfaces 41 on the first wedges. Each first pressure applying surface 31 has a radial distance to the longitudinal axis L that increases as seen in the above-mentioned first axial direction D1. The first pressure applying surfaces 31 are configured to press the first wedges 40 radially inwards in the first apertures 45 by pressing against the first pressure receiving surfaces 41 on the first wedges when the actuating sleeve 30 is moved in the first axial direction D1.

Each first wedge 40 also comprises a wedge surface 46, which faces towards the rear end 2b of the housing 2 and which is in contact with a first slide surface 16 on the drawbar 5 facing towards the front end 2a of the housing. When the first wedges 40 are pressed radially inwards in the first apertures 45 by the actuating sleeve 30, the wedge surface 46 of each first wedge 40 will slide and press against the corresponding first slide surface 16 on the drawbar and thereby force the drawbar 5 to move towards the retracted locking position.

Figure 10:
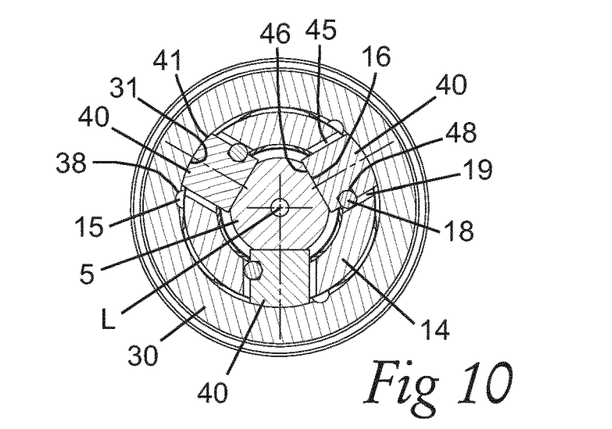
FIG. 10 is a cross-section according to the line X-X in FIG. 4.

In the illustrated embodiment, the wedge surface 46 of each first wedge and the associated first slide surface 16 on the drawbar 5 are formed as planar surfaces which are inclined in relation to the longitudinal axis L as seen in a longitudinal section through the housing 2 perpendicular to the longitudinal axis L. In this case, these surfaces 16, 46 are linear as seen in a cross-sectional plane perpendicular to the longitudinal axis L, as illustrated in FIG. 10. The wedge surface 46 of each first wedge and the associated first slide surface 16 on the drawbar 5 may as an alternative be curved as seen in a cross-sectional plane perpendicular to the longitudinal axis L. In the latter case, these surfaces 16, 46 are non-planar. As a further alternative, one of these surfaces 16, 46 could be curved as seen in a longitudinal section through the housing 2 perpendicular to the longitudinal axis L.

The actuating sleeve 30 is preferably configured to assume a self-locking axial position on the peripheral wall 14 when the drawbar 5 has been forced into the retracted locking position under the effect of the actuating sleeve 30 and the first wedges 40, so as to thereby allow the actuating sleeve 30 to keep the drawbar 5 in the retracted locking position. In the self-locking axial position, frictional forces between the actuating sleeve 30 and parts of the first wedges 40 and/or the peripheral wall 14 that are in contact with the actuating sleeve 30 prevent the actuating sleeve from being axially displaced in the second axial direction D2.

The first pressure applying surfaces 31 and the first pressure receiving surfaces 41 are preferably inclined in relation to the longitudinal axis L by such an angle α (see FIG. 4) that the first wedges 40 will keep the actuating sleeve 30 in a self-locking axial position on the peripheral wall 14 when the drawbar 5 has been forced into the retracted locking position under the effect of the actuating sleeve 30 and the first wedges 40.

In the illustrated embodiment, the clamping device 1 comprises three second wedges 50, which are spaced apart in the circumferential direction of the peripheral wall 14. Each second wedge 50 is slidably received in a respective second aperture 55 that extends radially through the peripheral wall 14. The second wedges 50 are configured to jointly press the drawbar 5 towards the advanced releasing position when they are pressed radially inwards in the associated second apertures 55.

The clamping device 1 may comprise any suitable number of second wedges 50 arranged to extend through a corresponding number of second apertures 55 in the peripheral wall 14 of the housing 2. The second wedges 50 and the associated second apertures 55 are preferably evenly distributed in the circumferential direction of the peripheral wall 14.

Each second wedge 50 comprises a second pressure receiving surface 52 which faces outwards from the peripheral wall 14 of the housing 2, and the actuating sleeve 30 is on its inner side provided with second pressure applying surfaces 32 which face inwards for contacting the second pressure receiving surfaces 52 on the second wedges. Each second pressure applying surface 32 has a radial distance to the longitudinal axis L that increases as seen in the above-mentioned second axial direction D2. The second pressure applying surfaces 32 are configured to press the second wedges 50 radially inwards in the second apertures 55 by pressing against the second pressure receiving surfaces 52 on the second wedges when the actuating sleeve 30 is moved in the second axial direction D2.

Each second wedge 50 also comprises a wedge surface 57, which faces towards the front end 2a of the housing 2 and which is in contact with a second slide surface 17 on the drawbar 5 facing towards the rear end 2b of the housing. When the second wedges 50 are pressed radially inwards in the second apertures 55 by the actuating sleeve 30, the wedge surface 57 of each second wedge 50 will slide and press against the corresponding second slide surface 17 on the drawbar and thereby force the drawbar 5 to move towards the advanced locking position.

Figure 11:
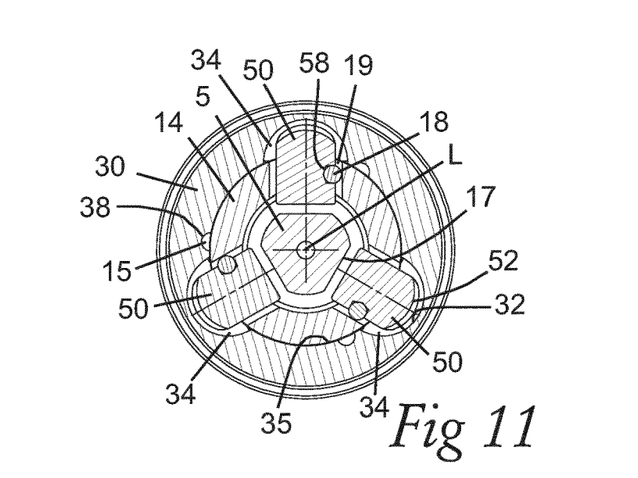
FIG. 11 is a cross-section according to the line XI-XI in FIG. 4.

In the illustrated embodiment, the wedge surface 57 of each second wedge and the associated second slide surface 17 on the drawbar 5 are formed as planar surfaces which are inclined in relation to the longitudinal axis L as seen in a longitudinal section through the housing 2 perpendicular to the longitudinal axis L. In this case, these surfaces 17, 57 are linear as seen in a cross-sectional plane perpendicular to the longitudinal axis L, as illustrated in FIG. 11. The wedge surface 57 of each second wedge and the associated second slide surface 17 on the drawbar 5 may as an alternative be curved as seen in a cross-sectional plane perpendicular to the longitudinal axis L. In the latter case, these surfaces 17, 57 are non-planar. As a further alternative, one of these surfaces 17, 57 could be curved as seen in a longitudinal section through the housing 2 perpendicular to the longitudinal axis L.

Each first wedge 40 may also comprise a third pressure receiving surface 43 which faces outwards from the peripheral wall 14 of the housing 2, wherein the actuating sleeve 30 on its inner side is provided with a third pressure applying surface 33 which faces inwards for contacting the third pressure receiving surface 43 on each first wedge. The third pressure applying surface 33 has a radial distance to the longitudinal axis L that increases as seen in the first axial direction D1. The third pressure applying surface 33 and the third pressure receiving surfaces 43 are inclined in relation to the longitudinal axis L by an angle β (see FIG. 6) which is larger than the above-mentioned angle α. The first and third pressure applying surfaces 31, 33 and the first and third pressure receiving surfaces 41, 43 are arranged consecutively on the actuating sleeve 30 and on each first wedge 40, respectively, such that, upon a movement of the actuating sleeve 30 in the first axial direction D1, the third pressure applying surface 33 is configured to slide and press against the associated third pressure receiving surfaces 43 during an initial first phase of the movement, whereupon the first pressure applying surfaces 31 are configured to slide and press against the associated first pressure receiving surfaces 41 during a subsequent second phase of the movement.

In the illustrated embodiment, said third pressure applying surface 33 on the actuating sleeve 30 has the form of an annular rotationally symmetric surface. In this case there is one single third pressure applying surface 33 on the actuating sleeve 30. However, the actuating sleeve 30 could as an alternative be provided with several separate third pressure applying surfaces 33 corresponding to the number of first wedges 40, wherein the third pressure receiving surface 43 on each first wedge 40 is associated with its own third pressure applying surface 33 on the actuating sleeve 30.

The first and third pressure applying surfaces 31, 33 and the first and third pressure receiving surfaces 41, 43 are with advantage curved as seen in a cross-sectional plane perpendicular to the longitudinal axis L. Also the second pressure applying surfaces 32 and the second pressure receiving surfaces 52 may be curved as seen in a cross-sectional plane perpendicular to the longitudinal axis L. However, one or more of the pressure applying surfaces 31, 32, 33 and pressure receiving surfaces 41, 52, 43 may as an alternative have the form of planar surfaces and consequently be linear as seen in a cross-sectional plane perpendicular to the longitudinal axis L. In the illustrated embodiment, each second pressure applying surface 32 is provided in a recess 34 formed in a rotationally symmetric inner wall surface 35 of the actuating sleeve 30. Furthermore, in the illustrated embodiment, a portion 39 of this rotationally symmetric inner wall surface 35 on the inner side of the actuating sleeve is conically shaped and the first pressure applying surfaces 31 are provided on different parts of this conically shaped wall portion 39.

The first wedges 40 and the second wedges 50 are preferably alternately arranged as seen in the circumferential direction of the peripheral wall 14, wherein each one of the first wedges 40 is followed by one of the second wedges 50 as seen in the circumferential direction of the peripheral wall 14 and each one of the second wedges 50 is followed by one of the first wedges 40 as seen in the circumferential direction of the peripheral wall 14.

In the illustrated embodiment, the first pressure applying surfaces 31 and the second pressure applying surfaces 32 partly overlap each other in the axial direction of the actuating sleeve 30 and they are spaced apart from each other in the circumferential direction of the actuating sleeve 30.

The first and second wedges 40, 50 are non-rotatably received in the associated first and second apertures 45, 55 in the peripheral wall 14 of the housing 2, i.e. each wedge is prevented from rotating in the associated aperture. In the illustrated embodiment, each wedge 40, 50 and the associated aperture 45, 55 in the peripheral wall 14 have mutual contact surfaces with a circular cross-sectional shape. In this case, a ball 18 (see FIGS. 10 and 11) is arranged between each wedge 40, 50 and the inner surface of the associated aperture 45, 55, wherein this ball 18 is accommodated partly in a recess 48, 58 in an envelope surface of the wedge and partly in an elongated groove 19 in the inner surface of the aperture. The ball 18 remains fixed in position in relation to the associated wedge 40, 50 by being received in the recess 48, 58 on the envelope surface thereof. The ball 18 is slidably received in the elongated groove 19 in the associated aperture 45, 55, and the wedge 40, 50 is thereby allowed to move in the axial direction of the associated aperture 45, 55 at the same time as the ball 18 prevent the wedge from rotating in the aperture. As an alternative, the envelope surfaces of the wedges 40, 50 and the inner surfaces of the apertures 45, 55 could have a non-circular cross-sectional shape, for instance an oval cross-sectional shape, in order to prevent the wedges from rotating in the associated apertures.

The clamping device 1 may also comprise additional components, such as one or more hydraulic of pneumatic actuators, for effecting the movement of the actuating sleeve 30 in the first and second axial directions D1, D2. The control of the clamping device 1 may easily by automatized by means of such an actuator. Thus, the clamping device 1 according to the present invention is suitable for use in automatic tool changing operations. However, the clamping device 1 according to the present invention may also be adapted for manual operation.

When a tool holder 60 is to be clamped to the housing 2, the tool holder shank 61 is inserted into the mounting portion 10 of the bore 3 with the drawbar 5 positioned in the advanced releasing position, as illustrated in FIG. 5. Hereby, the head portion 6 of the drawbar is received in the engagement bore 62 in the tool holder shank 61 and the engagement groove 64 in the tool holder shank 61 is positioned on the outside of the engagement flanges 27 of the engagement members 20. Thereupon, the actuating sleeve 30 in moved in the first axial direction D1, for instance by means of a hydraulic or pneumatic actuator or manual operation. During a first phase of this axial movement of the actuating sleeve 30, the third pressure applying surface 33 on the actuating sleeve 30 will slide and press against the third pressure receiving surfaces 43 on the first wedges 40. Hereby, the first wedges 40 will be pressed radially inwards and the drawbar 5 will be axially displaced towards the retracted locking position. Due to the relatively steep inclination 13 of the third pressure applying and receiving surfaces 33, 43, the first wedges 40 will initially move inwards rather fast, which results in a relatively quick displacement of the drawbar 5. The relatively steep angle β is advantageous since the initial displacement of the drawbar 5 does not require much force. The first and third pressure applying surfaces 31, 33 and the first and third pressure receiving surfaces 41, 43 are so arranged that when the actuating sleeve 30 has been moved such a distance that the third pressure applying surface 33 has passed the third pressure receiving surface 43 and the first pressure applying surface 31 reaches the first pressure receiving surface 41, i.e. at the transition between these respective surfaces, the drawbar 5 has almost reached its final retracted position in the bore 3. Hence, for the final clamping phase, in which a large force is beneficial, the first pressure applying and receiving surfaces 31, 41 are active. In this phase, a relatively large movement of the actuating sleeve 30 will result in a very small radial displacement of the first wedges 40, and an even smaller axial displacement of the drawbar 5, which consequently will provide a force amplifying effect that will make it possible for the drawbar 5 to pull the tool holder shank 61 with a large force into firm engagement with the housing 2. Furthermore, the small inclination a of the first pressure applying and receiving surfaces 31, 41 will provide a self-locking effect and make sure that the clamping device will remain in the clamped state without requiring any additional locking means. Hereby, the force on the actuating sleeve 30 may be released when the drawbar 5 has reached the retracted locking position.

When a tool changing operation is to be performed and the tool holder 60 is to be released from the housing 2, the actuating sleeve 30 is moved in the second axial direction D2. When the actuating sleeve 30 is subjected to a sufficient force in the second axial direction D2, the self-locking frictional engagement between the first pressure applying surface 31 on the actuating sleeve 30 and the first pressure receiving surfaces 41 on the first wedges 40 will be released, whereupon the actuating sleeve 30 is moveable in relation to the housing 2 in the second axial direction. When the actuating sleeve 30 is moved in this direction, the second pressure applying surfaces 32 on the actuating sleeve 30 will slide and press against the second pressure receiving surfaces 52 on the second wedges 50.

Hereby, the second wedges 50 will be pressed radially inwards and the drawbar 5 will be axially displaced towards the advanced releasing position. When the drawbar 5 is moved towards the advanced releasing position, the outer end of the head portion 6 of the drawbar 5 will hit against a surface 65 in the engagement bore 62 in the tool holder shank 61 and thereby release the tool holder shank 61 from the housing 2. During the movement of the drawbar 5 towards the advanced releasing position, the first slide surfaces 16 on the drawbar 5 are pressed against the wedge surfaces 46 on the first wedges 40 and will thereby press the first wedges 40 radially outwards. The movement of the first wedges 40 in radial direction outwards is limited by a stop ring 36, which is fixed in an annular groove 37 on the inner side of the actuating sleeve 30.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A clamping device for releasably holding a tool holder shank, the clamping device comprising:
   a housing having a front end, a rear end and a bore which intersects the front end and extends rearwardly therefrom, wherein a mounting portion for receiving the tool holder shank is provided at a front end of the bore;
   a drawbar slidably mounted inside the bore so as to be reciprocally moveable in the bore along a longitudinal axis thereof between an advanced releasing position and a retracted locking position;
   engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion, to a second position, in which the engagement members are in locking engagement with the tool holder shank and keep it secured to the housing; and
   a first wedge having a wedge surface facing towards the rear end of the housing and a first pressure receiving surface, wherein the first wedge is slidably received in a first aperture that extends radially through a peripheral wall of the housing, wherein the first pressure receiving surface on the first wedge faces outwards from the housing and the wedge surface on the first wedge is in contact with a first slide surface on the drawbar facing towards the front end of the housing, the first wedge being configured to press the drawbar towards the retracted locking position when it is pressed radially inwards in the first aperture; that, the clamping device including a second wedge slidably received in a second aperture that extends radially through the peripheral wall, wherein the second wedge includes a second wedge surface, which faces towards the front end of the housing and is in contact with a second slide surface on the drawbar facing towards the rear end of the housing, and a second pressure receiving surface, which faces outwards from the housing, the second wedge being configured to press the drawbar towards the advanced releasing position when it is pressed radially inwards in the second aperture, wherein the clamping device includes an actuating sleeve arranged around the peripheral wall and slidably mounted to it so as to be axially moveable in relation to the housing in a first axial direction in order to effect a movement of the drawbar from the advanced releasing position to the retracted locking position and in an opposite second axial direction in order to effect a movement of the drawbar from the retracted locking position to the advanced releasing position, wherein the actuating sleeve on its inner side is provided with a first pressure applying surface, which faces inwards for contacting the first pressure receiving surface and has a radial distance to the longitudinal axis that increases as seen in said first axial direction, and a second pressure applying surface, which faces inwards for contacting the second pressure receiving surface and has a radial distance to the longitudinal axis that increases as seen in said second axial direction, wherein the first pressure applying surface is configured to press the first wedge radially inwards in the first aperture by pressing against the first pressure receiving surface when the actuating sleeve is moved in said first axial direction, and wherein the second pressure applying surface is configured to press the second wedge radially inwards in the second aperture by pressing against the second pressure receiving surface when the actuating sleeve is moved in said second axial direction.

2. The clamping device according to claim 1, wherein the actuating sleeve is configured to assume a self-locking axial position on the peripheral wall when the drawbar has been forced into the retracted locking position under the effect of the actuating sleeve and the first wedge, so as to thereby keep the drawbar in the retracted locking position.

3. The clamping device according to claim 2, wherein the first pressure applying surface and the first pressure receiving surface are inclined in relation to the longitudinal axis by such an angle α that the first wedge will keep the actuating sleeve in a self-locking axial position on the peripheral wall when the drawbar has been forced into the retracted locking position under the effect of the actuating sleeve and the first wedge.

4. The clamping device according to claim 3, wherein the first wedge includes a third pressure receiving surface which faces outwards from the housing, wherein the actuating sleeve on its inner side is provided with a third pressure applying surface, which faces inwards for contacting the third pressure receiving surface, the third pressure applying surface having a radial distance to the longitudinal axis that increases as seen in said first axial direction; that, wherein the third pressure applying surface and the third pressure receiving surface are inclined in relation to the longitudinal axis by an angle β, which is larger than the angle α, and wherein the first and third pressure applying surfaces and the first and third pressure receiving surfaces are arranged consecutively on the actuating sleeve and on the first wedge, respectively, such that, upon a movement of the actuating sleeve in the first axial direction, the third pressure applying surface is configured to slide and press against the third pressure receiving surface during a first phase of the movement and the first pressure applying surface is configured to slide and press against the first pressure receiving surface during a subsequent second phase of the movement.

5. The clamping device according to claim 4, wherein the first and third pressure applying surfaces and the first and third pressure receiving surfaces are curved as seen in a cross-sectional plane perpendicular to the longitudinal axis.

6. The clamping device according to claim 1, wherein the first pressure applying surface and the second pressure applying surface partly overlap each other in the axial direction of the actuating sleeve and are spaced apart from each other in the circumferential direction of the actuating sleeve.

7. The clamping device according to claim 6, wherein the second pressure applying surface is provided in a recess formed in a rotationally symmetric inner wall surface of the actuating sleeve.

8. The clamping device according to claim 1, wherein the clamping device includes two or more such first wedges spaced apart in the circumferential direction of the peripheral wall, each first wedge being received in a respective first aperture that extends radially through the peripheral wall.

9. The clamping device according to claim 8, wherein the first wedges are three in number.

10. The clamping device according to claim 8, wherein the first wedges are evenly distributed in the circumferential direction of the peripheral wall.

11. The clamping device according to claim 8, wherein the clamping device includes two or more such second wedges spaced apart in the circumferential direction of the peripheral wall, each second wedge being received in a respective second aperture that extends radially through the peripheral wall.

12. The clamping device according to claim 11, wherein the second wedges are three in number.

13. The clamping device according to claim 11, wherein the second wedges are evenly distributed in the circumferential direction of the peripheral wall.

14. The clamping device according to claim 11, wherein the first wedges and the second wedges are alternately arranged as seen in the circumferential direction of the peripheral wall, wherein each one of the first wedges is followed by one of the second wedges as seen in the circumferential direction of the peripheral wall and each one of the second wedges is followed by one of the first wedges as seen in the circumferential direction of the peripheral wall.

15. The clamping device according to claim 1, wherein the housing is a machine spindle.

* * * * *